(12) United States Patent
Moening et al.

(10) Patent No.: US 7,881,859 B2
(45) Date of Patent: Feb. 1, 2011

(54) TORQUE CONVERTER CLUTCH CONTROL SYSTEM AND POST OXYGEN SENSOR PERFORMANCE DIAGNOSTIC SYSTEM

(75) Inventors: Douglas J. Moening, Farmington, MI (US); Igor Anilovich, Walled Lake, MI (US); John W. Siekkinen, Novi, MI (US); Jayson S. Schwalm, Farmington Hills, MI (US); Daniel J. Wickman, Plymouth, MI (US)

(73) Assignee: GM Global Technology Operations, Inc.

( * ) Notice: Subject to any disclaimer, the term of this patent is extended or adjusted under 35 U.S.C. 154(b) by 281 days.

(21) Appl. No.: 12/039,130

(22) Filed: Feb. 28, 2008

(65) Prior Publication Data

US 2009/0118988 A1 May 7, 2009

Related U.S. Application Data

(60) Provisional application No. 60/984,592, filed on Nov. 1, 2007.

(51) Int. Cl.
*F02D 45/00* (2006.01)
*G06F 19/00* (2006.01)

(52) U.S. Cl. ................................................. 701/108
(58) Field of Classification Search ................. 701/109, 701/108, 103–105, 102; 123/350, 198 F; 477/57, 166, 169
See application file for complete search history.

(56) References Cited

U.S. PATENT DOCUMENTS 5,660,157 A * 8/1997 Minowa et al. ............. 123/350
5,927,240 A * 7/1999 Maxon ..................... 123/179.3

* cited by examiner

*Primary Examiner*—Hieu T Vo

(57) ABSTRACT

A system comprises a post oxygen performance diagnostic (POPD) module that performs a POPD of a post oxygen sensor, wherein the POPD includes a deceleration fuel cutoff (DFCO) portion. A torque converter control module adjusts operation of a torque converter clutch (TCC). The POPD module and the torque converter control module operate the TCC to control engine speed above a predetermined engine speed during the DFCO portion of the POPD. A method comprises performing a POPD of a post oxygen sensor, wherein the POPD includes a deceleration fuel cutoff (DFCO) portion and adjusting operation of a torque converter clutch (TCC) to control engine speed above a predetermined engine speed during the DFCO portion of the POPD.

18 Claims, 2 Drawing Sheets

_US 7,881,859 B2_

Figure 1:
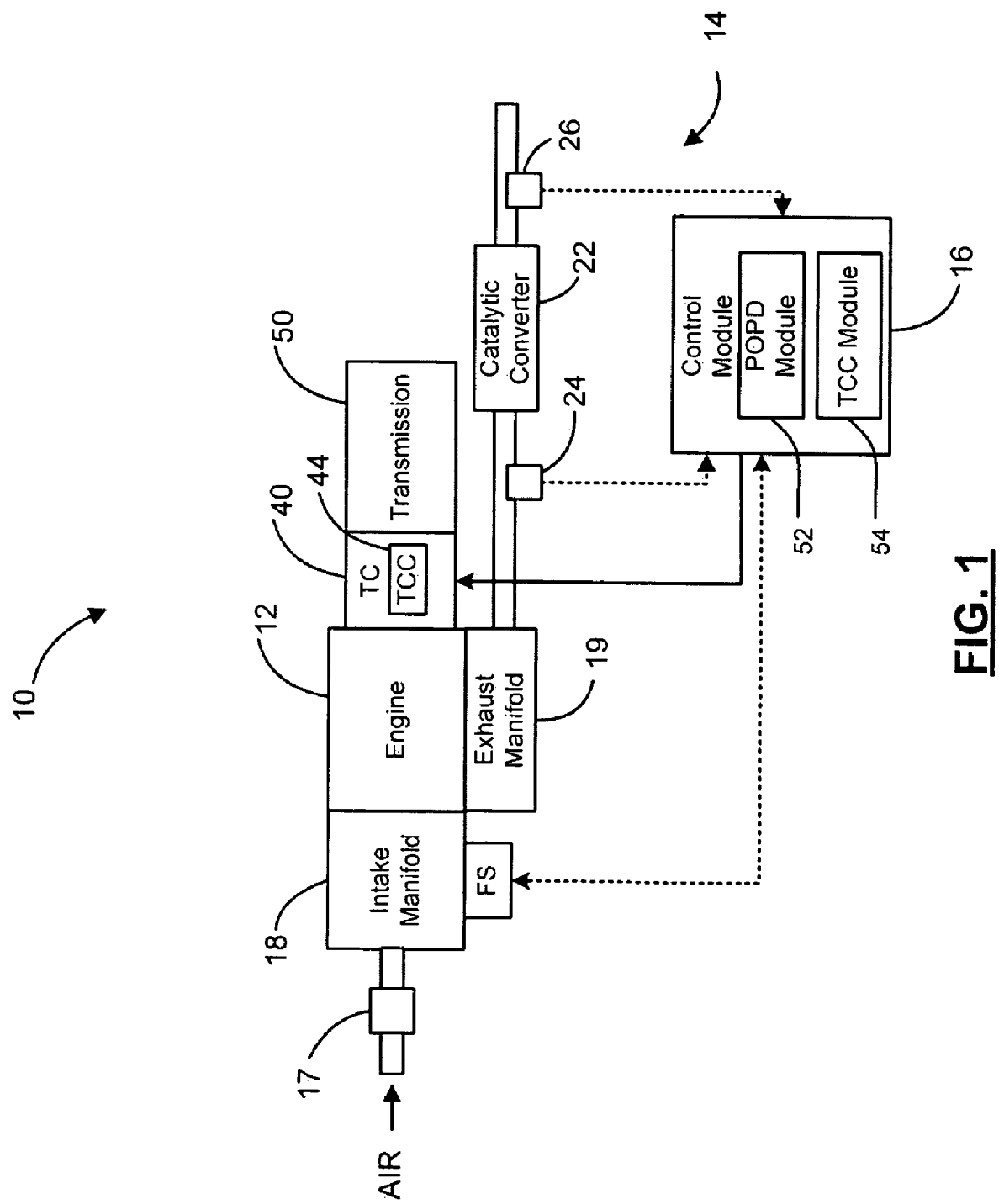

TORQUE CONVERTER CLUTCH CONTROL SYSTEM AND POST OXYGEN SENSOR PERFORMANCE DIAGNOSTIC SYSTEM

CROSS-REFERENCE TO RELATED APPLICATIONS

This application claims the benefit of U.S. Provisional Application No. 60/984,592, filed on Nov. 1, 2007. The disclosure of the above application is incorporated herein by reference in its entirety.

FIELD

The present disclosure relates to vehicles including a post oxygen performance diagnostic system.

BACKGROUND

The statements in this section merely provide background information related to the present disclosure and may not constitute prior art.

During the combustion process, gasoline is oxidized and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

Automobile exhaust systems include a catalytic converter that reduces exhaust emissions by chemically converting the exhaust gas into carbon dioxide ($CO_2$), nitrogen (N), and water ($H_2O$). Exhaust gas oxygen sensors generate signals indicating the oxygen content of the exhaust gas. An inlet or pre-catalyst oxygen sensor monitors the oxygen level associated with an inlet exhaust stream of the catalytic converter. This inlet $O_2$ sensor is also the primary feedback mechanism that maintains the air-to-fuel (A/F) ratio of the engine at the chemically correct or stoichiometric A/F ratio that is needed to support the catalytic conversion processes. An outlet or post-catalyst oxygen sensor monitors the oxygen level associated with an outlet exhaust stream of the catalytic converter. The post-$O_2$ sensor signal is used for secondary A/F ratio control.

Engine diagnostic systems require properly functioning oxygen sensors. Therefore, the oxygen sensors are periodically checked to ensure proper function. Traditionally, the diagnostic systems employ intrusive checks to check the operation of the sensors. During the intrusive checks, the A/F ratio may be manipulated and the sensor response is monitored. However, these intrusive checks may increase exhaust emissions and/or cause engine instability and reduced drivability that may be noticeable to a vehicle operator.

During some operating conditions, an engine control system may cutoff fuel to the engine during deceleration. This technique is often referred to as deceleration fuel cutoff (DFCO). Some diagnostic systems evaluate operation of the post-catalyst oxygen sensor during DFCO.

SUMMARY

A system comprises a post oxygen performance diagnostic (POPD) module that performs a POPD of a post oxygen sensor, wherein the POPD includes a deceleration fuel cutoff (DFCO) portion. A torque converter control module adjusts operation of a torque converter clutch (TCC). The POPD module and the torque converter control module operate the TCC to control engine speed above a predetermined engine speed during the DFCO portion of the POPD.

A method comprises performing a POPD of a post oxygen sensor, wherein the POPD includes a deceleration fuel cutoff (DFCO) portion, and adjusting operation of a torque converter clutch (TCC) to control engine speed above a predetermined engine speed during the DFCO portion of the POPD.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
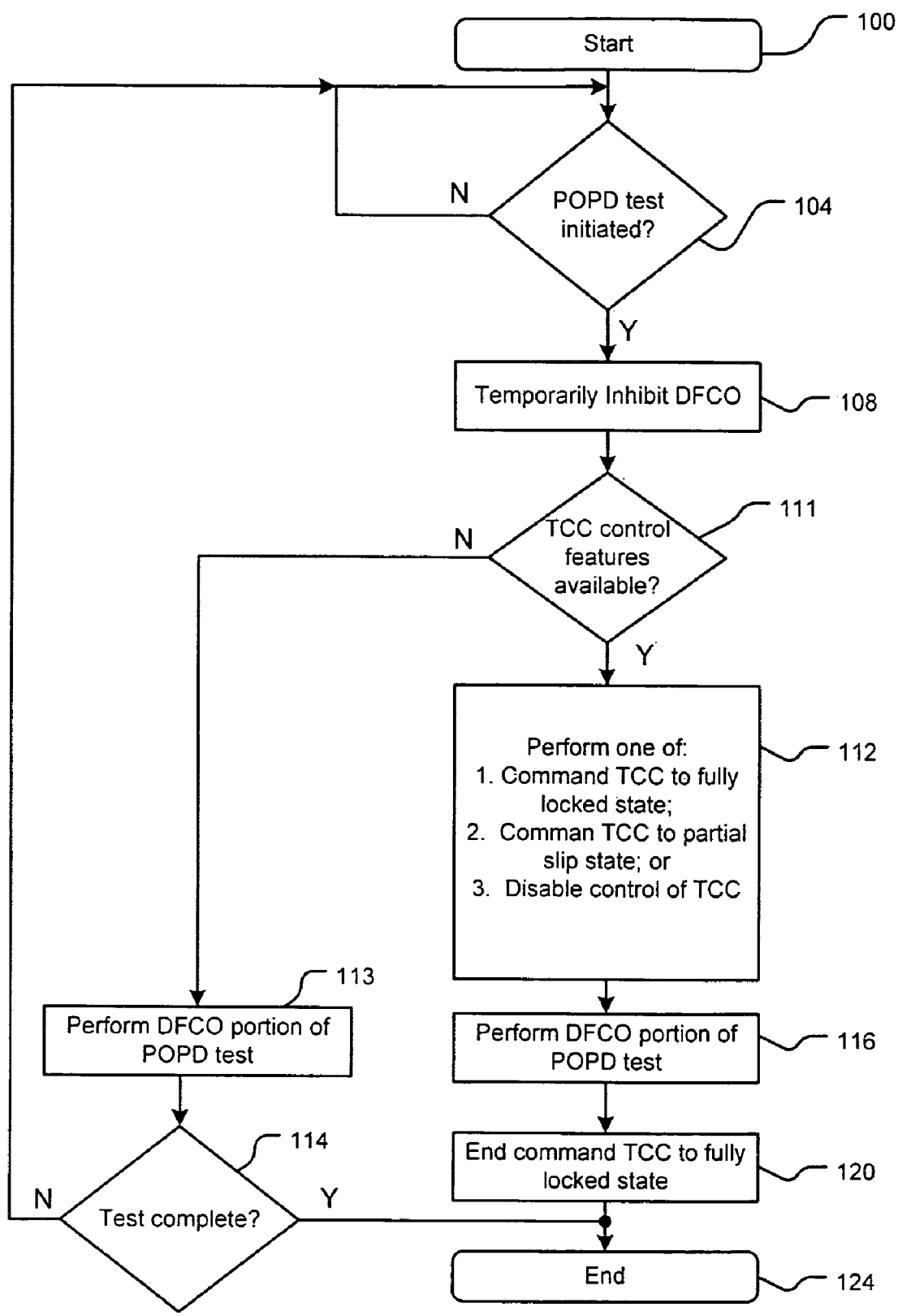

FIG. 1 is a functional block diagram of an engine control system according to the present disclosure; and FIG. 2 is a flowchart illustrating exemplary operation of the control module of FIG. 1.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine system 10 includes an engine 12, an exhaust system 14 and a control module 16. Air is drawn into the engine 12 through a throttle 17 and an intake manifold 18, and is mixed with fuel in the engine 12. The air and fuel mixture is combusted within cylinders (not shown) to generate drive torque. The gases produced via combustion exit the engine through an exhaust manifold 19 and the exhaust system 14. The exhaust system 14 includes a catalytic converter 22, a pre-catalyst or inlet oxygen sensor 24, hereinafter pre-$O_2$ sensor 24 and a post-catalyst oxygen sensor 26, herein after post-$O_2$ sensor 26. The exhaust gases are treated within the catalytic converter 22 and are exhausted to atmosphere.

The pre-$O_2$ sensor 24 and the post-$O_2$ sensor 26 generate respective signals that are communicated to the control module 16. The pre-$O_2$ and post-$O_2$ sensor signals indicate the oxygen content of the exhaust entering and exiting the catalytic converter 22, respectively. The control module 16 communicates with a fuel system to regulate fuel flow to the engine 12 based on the sensor signals. An output of the engine 12 is input to a torque converter (TC) 40 having a torque converter clutch (TCC) 44. An output of the TC 40 is input to a transmission 50.

The control module 16 may include a post oxygen performance diagnostic (POPD) module 52 that performs a POPD. The POPD may include a deceleration fuel cutoff (DFCO) portion. The control module 16 may also include a torque converter control module 54 that controls operation of a torque converter clutch (TCC).

As can be appreciated, the engine system 10 may include a wide variety of sensors that provide inputs to the control module 16. Furthermore, one or more accessories, actuators or other devices may receive control signals from the control module 16. Furthermore, the control module 16 may be implemented using an engine control module, an engine control module and a transmission control module, or using other arrangements. The control module 16 may optionally perform electronic throttle control. Still other variations are contemplated.

The present disclosure allows the engine system 10 to maintain engine speed during a deceleration fuel cutoff (DFCO) portion of a post oxygen performance diagnostic (POPD) system. During DFCO, some vehicles release the TCC 44. Without engine braking, the engine speed will quickly decrease to idle speed. As a result of the reduced engine speed, the control module 16 may disable the POPD system before completion due to the reduced engine speed. For example, the POPD system may require engine speeds greater than 800 revolutions per minute (RPM).

The engine system 10 according to the present disclosure maintains the TCC 44 in a controlled slip state or a lock state during DFCO, which causes the engine 12 to be in an engine braking condition. As a result of the engine braking, the engine 12 will have a higher engine speed during DFCO. Therefore, the control module 16 will be able to complete the POPD during DFCO. The TCC Module 44 decides the appropriate action (lock state, controlled slip state or ignore POPD request) based on ability for POPD to complete, driveability and transmission hardware limitations. One means by which the TCC control can respond to the POPD assistance request, is to maintain powertrain driveline coupling, by locking the TCC or maintaining the TCC in a controlled slip condition.

As can be appreciated, the dynamics that are involved are different for each transmission design, and hence some development work may be required to determine the specific actions for each application. The control module may honor the request except when this would conflict with hardware protection and/or durability, transmission diagnostic actions, torque security actions, engine stalling concerns, minimum transmission pump speed criteria or otherwise cause customer dissatisfaction due to noise, vibration and harshness (NVH) problems. Still other criteria may be used.

While the engine speed may stay high enough during DFCO to complete the POPD when the vehicle is travelling greater than 55 mph, test vehicles do not typically travel at this speed during current emissions testing procedures. As a result, the POPD test may not complete during emissions testing, which may pose problems for certification.

The control module 16 commands the TCC 44 to either a locked state or a controlled slip state to maintain the engine speed and prevent a rapid decrease in engine speed during a DFCO portion of the POPD test. As a result, the engine 12 remains mechanically linked to the drive wheels allowing the momentum of the vehicle to maintain a higher engine speed, which allows more time/airflow to complete the POPD diagnostic.

The POPD test was developed to meet the requirements for emissions systems using the post-$O_2$ sensor 26 for diagnosis of the catalytic converter 22. Vehicles using this approach need to test the post-$O_2$ sensor 26. Furthermore, the diagnostic system may also measure the performance of the post-$O_2$ sensor 26 in a forced rich condition and a lean condition.

The POPD test may be enabled when the engine is in proper conditions for a DFCO. Further operating conditions include a minimum engine speed, minimum vehicle speed, and/or other conditions. If the monitored conditions fall outside under these conditions, the POPD will disable and abort the test.

When the POPD test is enabled, the POPD test may command the engine control system to a DFCO inhibit state for a predetermined period. This prevents normal DFCO from occurring before the POPD is ready for the DFCO portion of the POPD test. At the start of the predetermined period, the control module may command the TCC 44 into a fully locked state. In the fully locked state, the engine 12 is fully coupled to the transmission 50. The TCC 44 remains in the fully locked state for a sufficient amount of time to allow the POPD test to complete or the DFCO portion of the POPD test to complete.

Alternately, the control module commands a controlled slip of the TCC 44 at the start of the predetermined period instead of fully locking the TCC 44. The controlled TCC slip allows the engine speed to be elevated over an increased window of operation to allow the POPD test a sufficient amount of time to complete or the DFCO portion of the POPD test to complete.

Alternately, if TCC control features are not available (driveability concerns and/or transmission hardware limitations), the TCC control actions related to the POPD request may be ignored. The POPD will then continue to send the request until it completes the DFCO portion of the POPD test. Once the DFCO is complete, the POPD ends the TCC request mode. From this point, the POPD test does not depend upon engine speed or vehicle speed.

Engine speed will decrease more slowly during the DFCO portion of the POPD test as a result of the present disclosure. For example, the engine speed may decrease less during the DFCO portion of the POPD test with the TCC 44 at full lock as compared to normal control. In other words, without using the control of the present invention, the engine speed may decelerate to a disable speed condition such as 800 RPM before completing the DFCO portion of the POPD test.

Referring now to FIG. 2, steps of a method for controlling the TCC during the DFCO portion of the POPD test are shown. Control begins with step 100 and continues with step 104. If step 104 is true, control continues with step 104 and determines whether the POPD test has been initiated. In step 108, control temporarily inhibits DFCO. In step 111, control determines whether TCC control features are available (for example only, the features may be temporarily or permanently unavailable due to driveability concerns and/or transmission hardware limitations). If step 111 is false, the POPD will then continue with step 113 and attempt to perform the DFCO portion of the POPD test. If the test completes as determined in step 114, control ends in step 124. However, completion is less likely in this mode for reasons described above.

If step 111 is true and the TCC control features are available, control continues with step 112. In step 112, control commands the TCC 44 to a locked state or a partial slip state or disables control of the TCC 44 In step 116, control performs the DFCO portion of the POPD test. In step 120, control ends the locked state when the DFCO portion is done. At this point, control finishes the POPD test and control ends in step 124.

What is claimed is:

1. A system comprising:
  a post oxygen performance diagnostic (POPD) module that performs a POPD of a post oxygen sensor, wherein said POPD includes a deceleration fuel cutoff (DFCO) portion; and a torque converter control module that adjusts operation of a torque converter clutch (TCC), wherein said POPD module and said torque converter control module operate said TCC to control engine speed above a predetermined engine speed during said DFCO portion of said POPD.

2. The system of claim 1 wherein said POPD module and said torque converter control module command said TCC to a locked state prior to performing the DFCO portion of the POPD.

3. The system of claim 2 wherein said POPD module and said torque converter control module release said TCC from said locked state after completing said DFCO portion of said POPD.

4. The system of claim 1 wherein said POPD module and said torque converter control module command said TCC to a slip state prior to performing the DFCO portion of the POPD.

5. The system of claim 4 wherein said POPD module and said torque converter control module release said TCC from said slip state after completing said DFCO portion of said POPD.

6. The system of claim 1 wherein said POPD module disables said torque converter control module prior to performing the DFCO portion of the POPD.

7. The system of claim 6 wherein said POPD module enables said torque converter control module after completing said DFCO portion of said POPD.

8. The system of claim 1 wherein said POPD module disables DFCO after initiating said POPD and before initiating said DFCO portion of said POPD.

9. The system of claim 1 further comprising a control module including said POPD module and said torque converter control module.

10. The system of claim 1 further comprising said torque converter clutch and said post oxygen sensor.

11. A method comprising:
performing a post oxygen performance diagnostic (POPD) of a post oxygen sensor, wherein said POPD includes a deceleration fuel cutoff (DFCO) portion; and
adjusting operation of a torque converter clutch (TCC) to control engine speed above a predetermined engine speed during said DFCO portion of said POPD.

12. The method of claim 11 further comprising commanding said TCC to a locked state prior to performing the DFCO portion of the POPD.

13. The method of claim 12 further comprising releasing said TCC from said locked state after completing said DFCO portion of said POPD.

14. The method of claim 11 further comprising commanding said TCC to a slip state prior to performing the DFCO portion of the POPD.

15. The method of claim 14 further comprising releasing said TCC from said slip state after completing said DFCO portion of said POPD.

16. The method of claim 11 further comprising disabling a torque converter control module prior to performing the DFCO portion of the POPD.

17. The method of claim 16 further comprising enabling said torque converter control module after completing said DFCO portion of said POPD.

18. The method of claim 11 further comprising disabling DFCO after initiating said POPD and before initiating said DFCO portion of said POPD.

* * * * *